United States Patent
Quaderer et al.

(10) Patent No.: US 8,955,402 B2
(45) Date of Patent: Feb. 17, 2015

(54) SUGAR CANE YIELD MAPPING

(71) Applicants: James G Quaderer, Sunnyvale, CA (US); Michael F Cash, Mountain View, CA (US)

(72) Inventors: James G Quaderer, Sunnyvale, CA (US); Michael F Cash, Mountain View, CA (US)

(73) Assignee: Trimble Navigation Limited, Sunnyvale, CA (US)

( * ) Notice: Subject to any disclaimer, the term of this patent is extended or adjusted under 35 U.S.C. 154(b) by 86 days.

(21) Appl. No.: 13/750,083

(22) Filed: Jan. 25, 2013

(65) Prior Publication Data

US 2014/0208870 A1    Jul. 31, 2014

(51) Int. Cl.
*A01D 45/10* (2006.01)
*G01F 1/30* (2006.01)

(52) U.S. Cl.
CPC . *G01F 1/30* (2013.01); *A01D 45/10* (2013.01)
USPC .................................................... 73/865.8

(58) Field of Classification Search
None
See application file for complete search history.

(56) References Cited

U.S. PATENT DOCUMENTS

| | | | |
|---|---|---|---|
| 5,686,671 A | 11/1997 | Nelson | |
| 6,508,049 B1 * | 1/2003 | Cox et al. | 56/10.2 R |
| 6,851,662 B2 * | 2/2005 | Panigrahi et al. | 356/326 |
| 2013/0047980 A1 * | 2/2013 | Sohling et al. | 127/46.2 |

* cited by examiner

*Primary Examiner* — Robert R Raevis
(74) *Attorney, Agent, or Firm* — NUPAT,LLC; Morrison Ulman

(57) ABSTRACT

Sugar cane yield mapping improves the efficiency of sugar cane farming with benefits to both sugar producers and consumers.

10 Claims, 7 Drawing Sheets

SUGAR CANE YIELD MAPPING

TECHNICAL FIELD

The disclosure is related to measuring sugar cane yield.

BACKGROUND

Sugar cane grows in temperate and tropical climates, mostly within 22 degrees of the equator, and especially in Brazil. The crop requires a plentiful water supply and does not withstand frost. Sugar cane harvesting machines can process roughly 100 tons of raw material per hour. A harvester mows down cane stalks and chops them up into billets. The billets are carted from field to mill in large truckloads for refining into sugar.

Despite around two billion tons of sugar cane being produced worldwide every year, sugar cane yield monitoring is still in its infancy. There are currently no good ways to measure the yield of a cane field with spatial precision. Without maps of crop yield, it is hard for farmers to spot underperforming areas of their land. The result is cane farming that is not as efficient as it could be, leaving both producers and consumers worse off than necessary.

Hence, what are needed are systems and methods for mapping sugar cane yield, i.e. sugar quantity produced per unit area.

DETAILED DESCRIPTION

A sugar cane yield map may be obtained when two things are known about a set of sugar cane samples: how much sugar each sample has and where each sample came from. Several sugar cane yield mapping systems and techniques are described below. In each case, sugar cane sample locations are determined using a global navigational satellite system (GNSS) receiver. Such receivers are already found on some sugar cane harvesting equipment as they provide position and velocity information to harvester autopilot systems.

Various approaches to measuring sugar yield are described below. In some cases, sugar measurements are made "in-line"; i.e. on a harvesting machine just seconds after a cane stalk is cut. Such measurements may be based on optical or electrical techniques as the sugar content of cane juice affects its index of refraction, conductivity and capacitance. Alternatively, sugar cane billets may be labeled with their location when they are harvested and their sugar content measured later ("off-line") at a sugar mill, for example. Yield estimates depend on both quantity (e.g. weight of cane harvested per unit field area) and quality (e.g. sugar per unit weight of cane) of sugar cane harvested. The techniques described below focus mainly on sugar recoverable per unit cane; i.e. the quality of the cane crop.

Regardless of how or when it is measured, sugar yield may be plotted versus position (e.g. Lat/Lon) to create a contour, false color, 3D surface or other kind of map. When presented visually, sugar yield data instantly reveal problems with irrigation, fertilization and pests. Quantitative sugar yield maps may be used to generate fertilizer and pesticide prescriptions or show workers where to cut or fill to level a field suffering from uneven irrigation.

Figure 1:
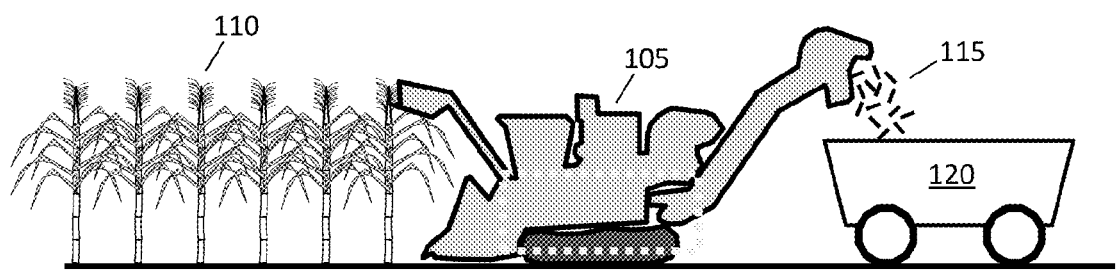
FIG. 1 shows a sugar cane harvester at work.

Sugar cane yield mapping is now described in more detail with the aid of the figures. FIG. 1 shows a sugar cane harvester 105 at work. The harvester cuts cane 110 and chops it into billets 115 which are collected by cart 120. Harvester 105 is equipped with a GNSS receiver to estimate its position and velocity. Cart 120 may also have a GNSS receiver. The harvester and cart may include systems for estimating the weight of crop harvested. For example, cart 120 may include load cells in its suspension to estimate weight and harvester 105 may include sensors to estimate the mass flow of billets through its elevator. Noisy weight measurements from load cells may be combined with mass flow measurements of unknown bias in a Kalman filter to estimate the weight of billets collected in the cart. Position information obtained from GNSS may be combined with these weight estimates to map crop density over a field.

The part of the harvester outlined by a heavy, gray dashed rectangle roughly outlines where cane stalks are knocked down by a knockdown roller, cut by a base cutter and transported by feed rollers to choppers which make billets. The billets are then lifted by an elevator and dumped into the cart. The sugar content of billets may be measured in-line, just after the billets are cut. However, it is not necessary to measure the sugar content of each billet; rather, a small sample may be used to estimate sugar in larger populations.

Figure 2A:
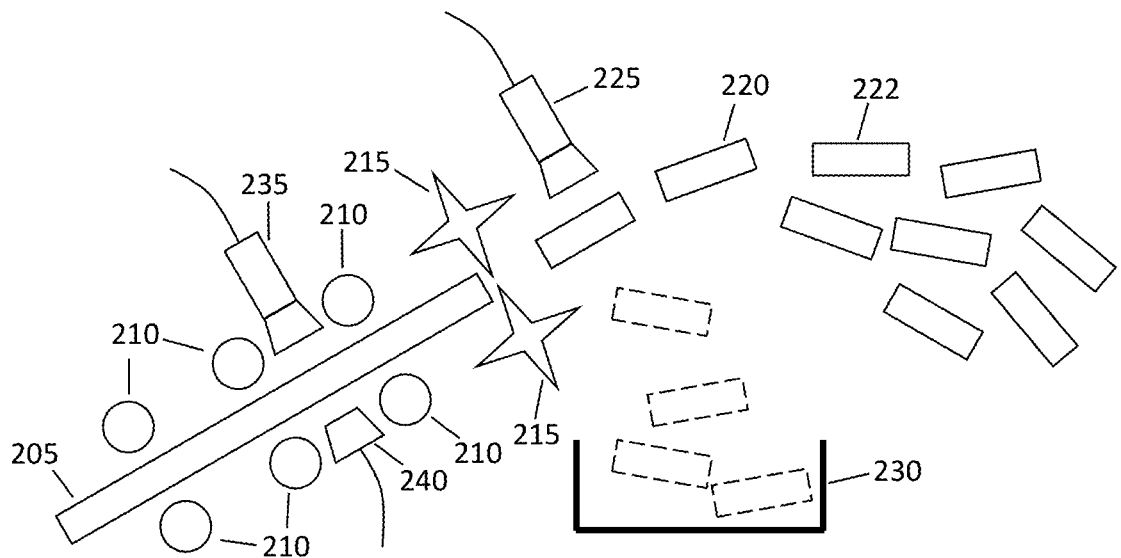
FIGS. 2A and 2B show a pneumatic sugar cane billet separator.
Figure 2B:
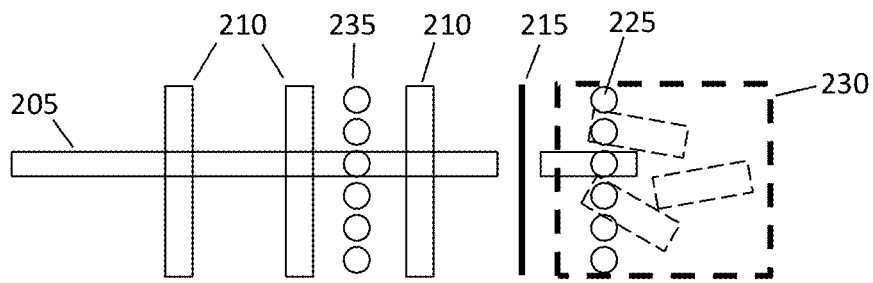

FIGS. 2A and 2B show a pneumatic sugar cane billet separator. The separator allows a few billets to be sampled from a large number of billets flowing through a harvester. Sugar in the sample billets is then measured using optical techniques. FIG. 2A is a side view and FIG. 2B is a top view of the separator system. In FIGS. 2A and 2B cane stalk 205 is transported by feed rollers 210 to chopper 215 which chops the stalk into billets such as billets 220 and 222.

From time to time, pneumatic cannon 225 blows billets into collection bin 230 instead of letting them fly into an elevator bowl and primary extractor as they otherwise would. The cannon can be set to deflect a certain number of billets per unit time or per unit distance travelled by a harvester. For example, if measurements on ten billets are required for statistical significance and the desired measurement resolution is once per ten square meters, then the cannon diverts one billet for each 1.8 feet of forward machine movement assuming a six-foot crop divider width.

The best sugar is in the bottom billet; i.e. the one that comes from the part of the stalk closest to the ground. The pneumatic sugar cane billet separator may select bottom billets in preference to other billets. This is accomplished by detecting the bottom of a cane stalk as it travels toward chopper 215. The speed of the stalk may be estimated from the rotation rate of the feed rollers. If the speed and position of the bottom are known, then the air cannon may emit an air blast at just the right time to deflect a bottom billet after it is cut from the stalk.

One way to detect the position of the bottom of a cane stalk is with air nozzle 235 and air flow detector 240. When no cane stalks are present in the roller train, air emitted by the air nozzle is detected by the detector. Lack of air detected at the detector indicates that a cane stalk is blocking the air flow. The time when air is first blocked is the time when the bottom of the cane stalk passes the nozzle/detector system. Both air cannon 225 and nozzle/detector system 235/240 may be implemented as arrays as indicated in FIG. 2B. That way billets may be selected from more than one cane stalk travelling up the roller chain. (Detectors 240 are omitted from FIG. 2B.) As an alternative to airflow detectors 240, back pressure in a pneumatic line feeding nozzle 235 may be monitored. An increase in back pressure indicates sugar cane blocking a nozzle.

Figure 2C:
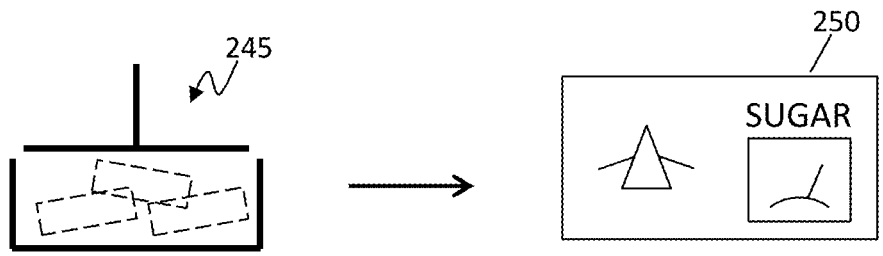
FIG. 2C shows a sugar cane billet crusher and an optical refractometer.

Billets that are selected by the pneumatic separator are then processed and measured. FIG. 2C shows (conceptually) a sugar cane billet crusher 245 and an optical refractometer 250 for this purpose. A billet crusher may be based on a piston arrangement as suggested by the figure, it may squeeze billets between rollers, or it may extract sugar cane juice in another way. Juice from the crusher may then be analyzed with a refractometer. Refractometers appropriate for sugar cane measurements are commercially available. A mechanical system may be supplied for drawing sugar cane juice through an optical test cell of a refractometer.

Figure 3A:
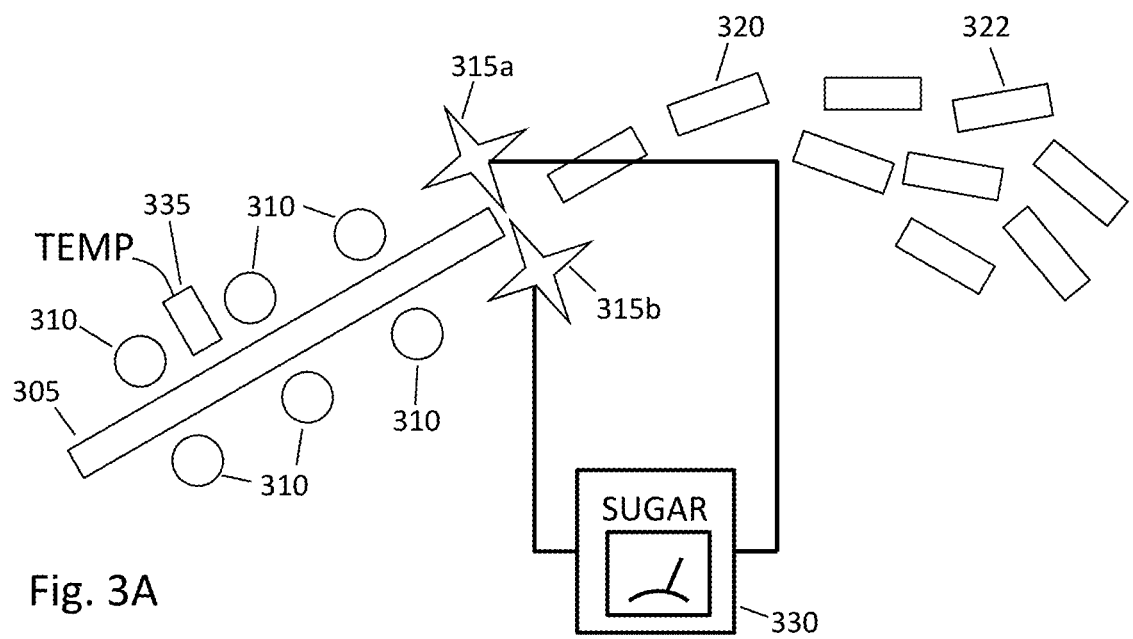
FIG. 3A shows a sugar cane electrical conductivity measurement system.
Figure 3B:
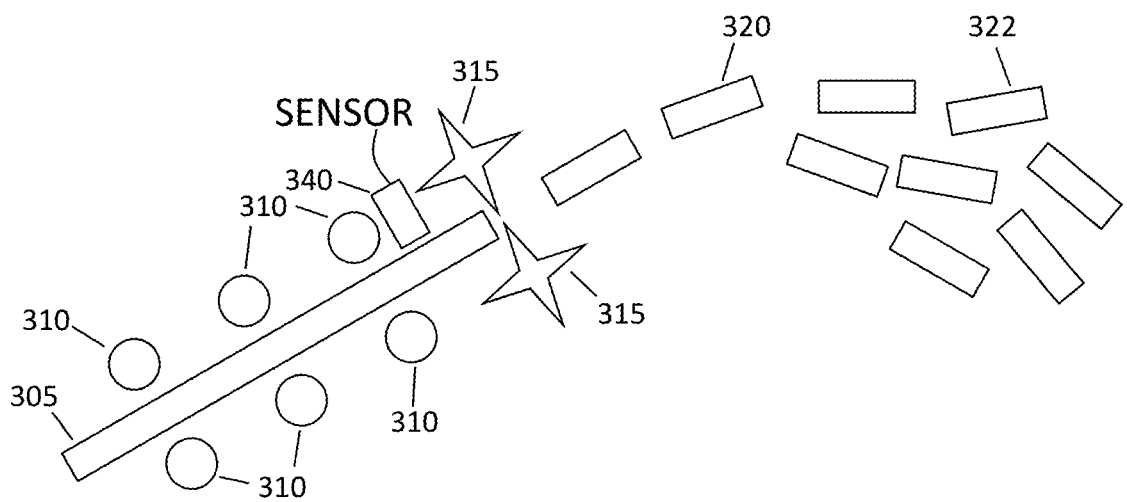
FIG. 3B shows a sugar cane electrical proximity measurement system.

Electrical measurements represent an alternative to optical sugar assaying techniques. FIGS. 3A and 3B illustrate two electrical measurement systems: FIG. 3A shows a sugar cane electrical conductivity measurement system while FIG. 3B shows a sugar cane electrical proximity measurement system.

In FIGS. 3A and 3B cane stalk 305 is transported by feed rollers 310 to chopper 315 which chops the stalk into billets such as billets 320 and 322. In FIG. 3A, individual four-bladed choppers are designated 315a and 315b. The conductivity of sugar cane juice is inversely proportional to it purity. In the system of FIG. 3A, conductivity of sugar cane juice is determined by measuring the conductivity between choppers 315a and 315b using meter 330. The conductivity of sugar cane juice is also a strong function of temperature. Hence temperature sensor 335 is provided to record temperature data. The measurement system of FIG. 3A measures sugar conductivity as each billet is created by chopping from a stalk. Therefore there is no need to separate sample billets for separate processing. In the system of FIG. 3B the conductivity of sugar cane juice is determined by sensor 340. Sensor 340 may be an eddy current sensor, for example, or another kind of electrical proximity sensor.

Figure 4:
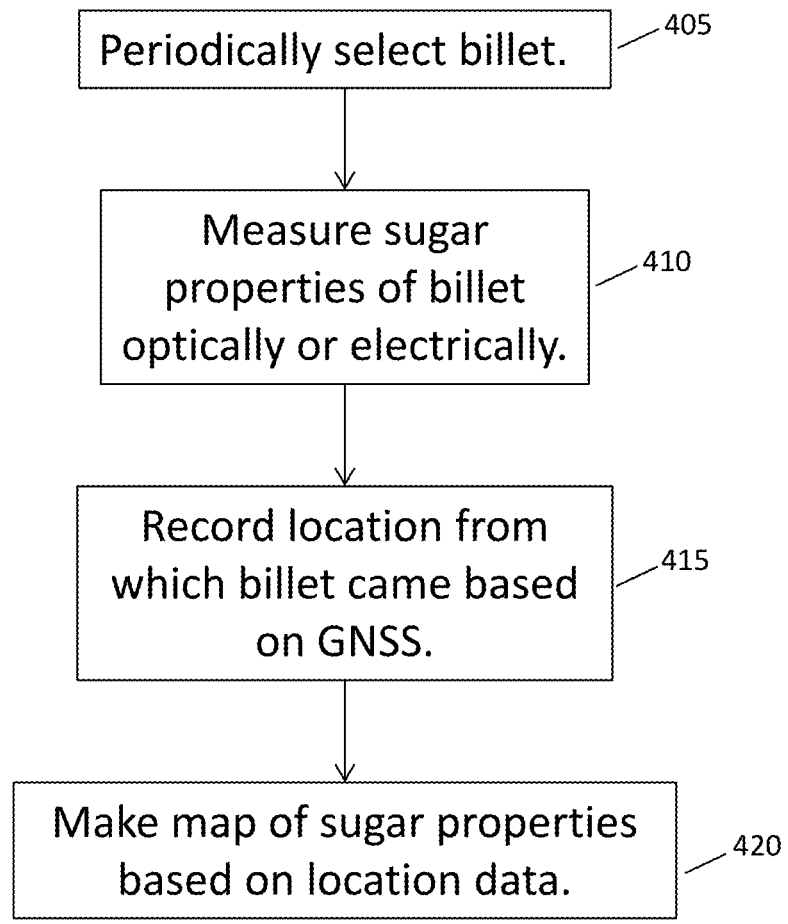
FIG. 4 is a flow chart that outlines a method for mapping sugar cane yield from in-line measurements.

In-line sugar measurements are correlated with GNSS position to generate sugar yield maps. FIG. 4 is a flow chart that outlines a method for mapping sugar cane yield. The steps of the flow chart are: 405, periodically select billet; 410, measure sugar properties of billet optically or electrically; 415, record location from which billet came based on GNSS; 420, make map of sugar properties based on location data.

Step 405 is optional. As we have seen, optical methods require a billet to be taken from the production flow for measurement. Electrical measurements may not require such a step, however. Step 405 may be performed using a pneumatic billet selector as described in conjunction with FIGS. 2A and 2B or with a mechanical deflector periodically inserted into the flow of billets.

Steps 410 and 415 may be performed in any order or simultaneously. Step 410 may include refractometer, conductivity or eddy current measurements as described in conjunction with FIGS. 2 and 3. Step 415 may be performed by a GNSS receiver mounted on a sugar cane harvester. The GNSS receiver communicates with the sugar measuring apparatus (e.g. refractometer, conductance meter, etc.) so that a correlation between position and sugar measurements may be made. In step 420, a map is made in which X and Y coordinates are spatial coordinates such as latitude and longitude, and Z represents sugar in units such as brix or kilograms of sucrose per ton of sugar cane. Z data may be plotted as a surface, contour plot, or in false color, as examples.

In-line sugar measuring systems may be made fully automatic such that no operator input is required. Off-line measuring systems, on the other hand, eliminate challenges associated with sample preparation and operating sensitive measuring instruments in the noisy and dirty environment of a sugar cane harvesting machine. Off-line measuring systems are based on the idea of labeling sampled billets with position information when they are harvested and measuring sugar later at a mill. Labeled billets may be measured along with other billets that are analyzed as part of normal processing.

Figure 5:
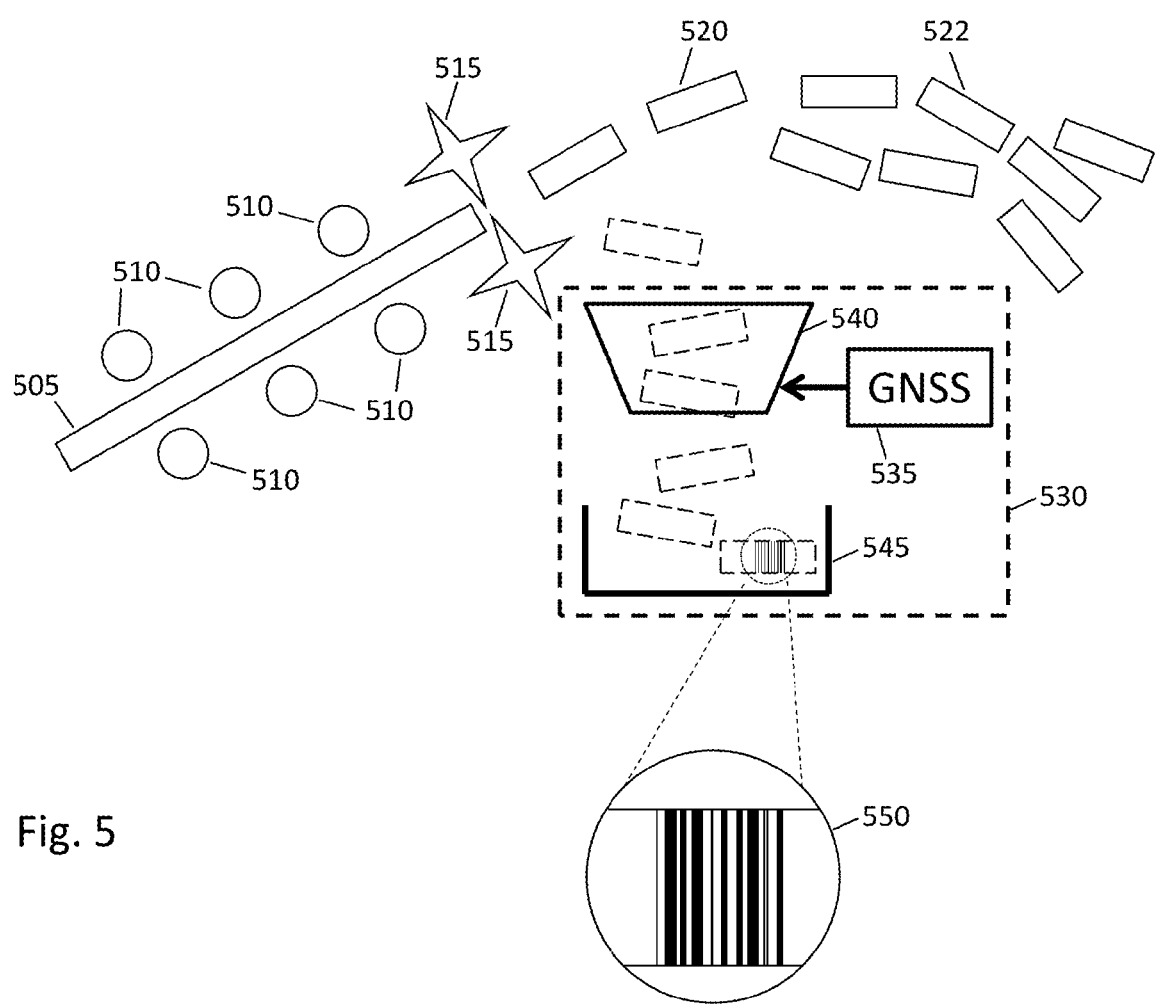
FIG. 5 shows a sugar cane billet labeling system.

FIG. 5 shows a sugar cane billet labeling system. In FIG. 5, cane stalk 505 is transported by feed rollers 510 to chopper 515 which chops the stalk into billets such as billets 520 and 522. A GNSS-enabled billet labeling system 530 labels billets to indicate the GNSS-derived location from which they were harvested.

A pneumatic cannon (e.g. cannon 225 in FIG. 2, not shown here) or mechanical deflector (not shown) forces a few billets into the labeling system instead of letting them fly into an elevator bowl and primary extractor as they otherwise would. Sample billets may be selected from the overall billet flow at time intervals (e.g. once per ten seconds) or distance intervals (e.g. once per ten meters of harvester travel).

Billet labeling system 530 includes GNSS receiver 535, labeler 540, and bin 545. GNSS receiver 535 may be a receiver included in a vehicle autopilot system or a receiver dedicated to billet labeling. The receiver provides GNSS derived position estimates to labeler 540. Labeler 540 labels billets. Labeled billets are collected in bin 545.

The labeler may write one- or two-dimensional barcodes directly on billets. Magnified view 550 shows an example 1D barcode printed directly on a billet. Alternatively it may apply adhesive backed barcode labels or radio frequency identification (RFID) tags to billets. It may also wrap billets in plastic wrap (e.g. polyvinylidene chloride, low density polyethylene, etc.), shrink wrap or other material before labeling.

A billet label may represent position information directly. For example, the barcode may contain the GNSS-derived latitude and longitude of the harvester at the time the billet is labeled. Alternatively, the billet label may represent only an indentifying number. In that case, the labeling system keeps a record of such numbers cross-referenced with position data. Either way, the position of the system at the time a billet is labeled is recorded and associated with that billet. The system may be calibrated to compensate for machine movement during the time between initial cane stalk cutting and billet labeling. Alternatively, such calibration can be performed later, off-line if the velocity of the harvester is also recorded along with position. Finally, a billet label may contain or refer to other information such as the time the billet was harvested, farm owner name, type of harvester used, outside temperature, etc.

Figure 6:
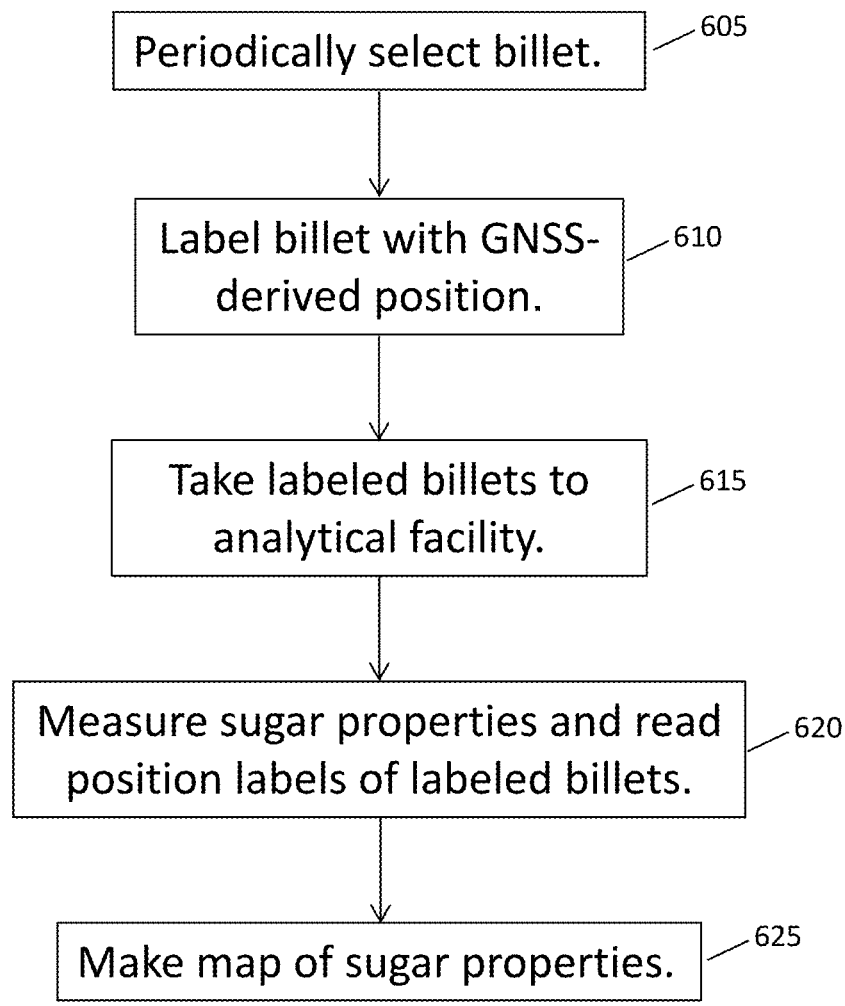
FIG. 6 is a flow chart that outlines a method for mapping sugar cane yield from off-line measurements.

FIG. 6 is a flow chart that outlines a method for mapping sugar cane yield from off-line measurements. The steps of the flow chart are: 605, periodically select billet; 610, label billet with GNSS position; 615, take labeled billets to analytical facility (usually a mill); 620, measure sugar properties and read position labels of labeled billets; and 625, make map of sugar properties.

Step 605 may be performed using a pneumatic billet selector as described in conjunction with FIGS. 2A and 2B or with a mechanical deflector periodically inserted into the flow of billets. Step 610 may be performed with a billet labeling system such as system 530 described in conjunction with FIG. 5.

Step 615 is to take labeled billets to an analytical facility. Most often, this is the sugar mill to which the bulk of the harvested billets are taken. Labeled billets may be taken to the mill in a burlap sack, for example. Labeled billets may even be reunited with unlabeled billets in a billet truck. However, it seems undesirable to mix them up only to have to find them later.

In normal practice, a mill takes a few billets from an incoming truckload and analyzes them to assess sugar quality and make process adjustments for optimum sugar recovery. When labeled billets are available, an additional step (620) is introduced into the normal billet analysis workflow: recording billet location and/or identification number. This leads to sugar property data paired with location data for each measured billet.

Finally (625), a map is made in which X and Y coordinates are spatial coordinates such as latitude and longitude, and Z represents sugar in units such as brix or kilograms of sucrose per ton of sugar cane. Z data may be plotted as a surface, contour plot, or in false color, as examples.

Figure 7:
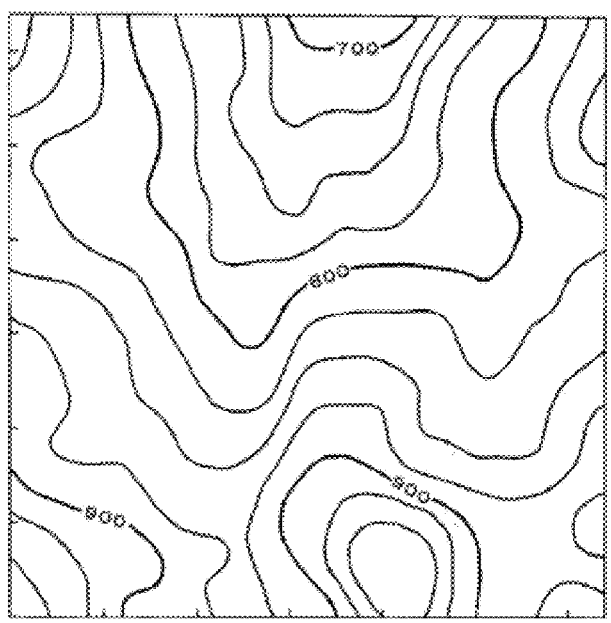
FIG. 7 is an example yield map.

FIG. 7 is an example yield contour map. FIG. 7 was not created from actual sugar yield data. Rather it represents one example of a kind of map that may be obtained using the techniques described above. The contours of the map correspond to sugar yield. For example, it might be that regions enclosed by contours labeled 900 or greater are those from which exceptional sugar yield is obtained while the 800 contour indicates only average yield and 700 is below average.

Off-line sugar yield analysis takes advantage of existing capabilities of sugar mills. On the other hand on-line sugar yield analysis may be fully automated and thereby eliminate the need to carry a bag of labeled billets to the mill. Either way, once sugar and location data are cross-referenced, maps of sugar yield may be made. These maps enable problem areas in a sugar cane field to be instantly identified.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A method for monitoring sugar cane yield comprising:
separating a sugar cane billet from a flow of billets in a sugar cane harvesting machine;
measuring sugar content of the separated billet;
recording the location from which the separated billet was harvested; and,
mapping the sugar content based the location.

2. The method of claim 1, the separating achieved by deflecting the billets from the flow using an air cannon.

3. The method of claim 2, the air cannon separating billets obtained from the bottom of sugar cane stalks.

4. The method of claim 1, the sugar content determined by optical refractometry.

5. The method of claim 1, the location determined by a GNSS receiver.

6. The method of claim 1, the measuring sugar content performed on the sugar cane harvesting machine.

7. A sugar cane yield monitoring system comprising:
a sugar cane billet separator that separates a sugar cane billet from a flow of billets in a sugar cane harvesting machine;
an in-line sugar cane analysis system that measures sugar content of the separated billet; and,
a GNSS receiver in communication with the sugar cane analysis system to provide location information for the selected billets.

8. The system of claim 7, the separator comprising an air cannon.

9. The system of claim 8, further comprising a pneumatic sensor system in communication with the air cannon such that the air cannon separates a billet obtained from the bottom of a sugar cane stalk.

10. The system of claim 7, the in-line sugar cane analysis system comprising an optical refractometer.

\* \* \* \* \*